Sept. 19, 1939.   F. T. FORD   2,173,199
BEARING LINING JIG
Filed Aug. 17, 1938
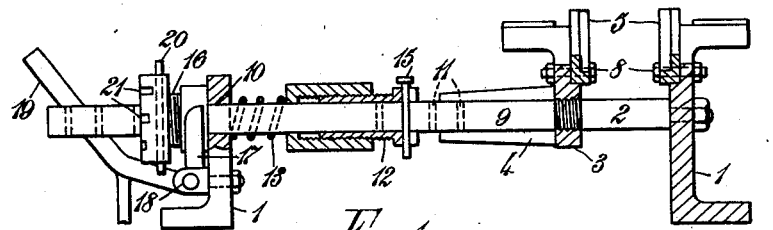
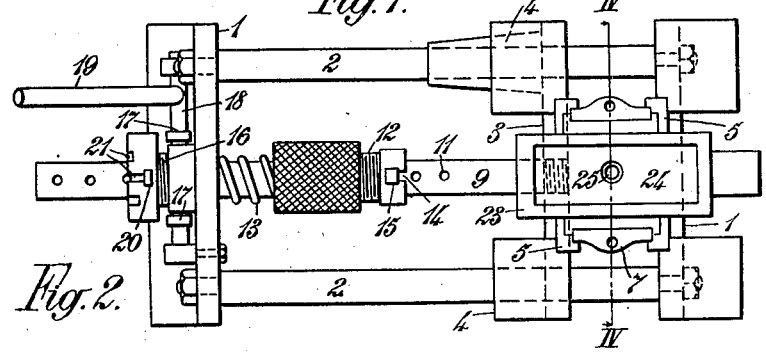
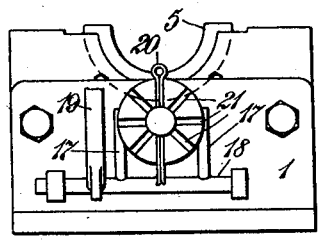 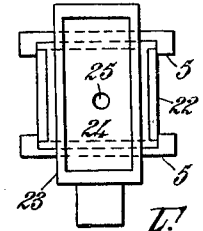
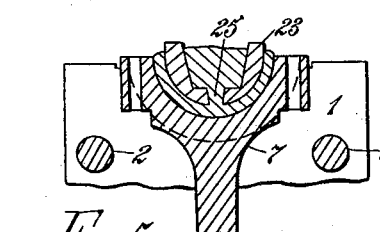
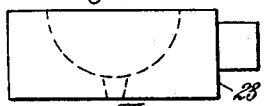 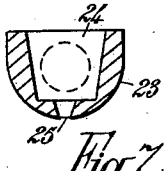 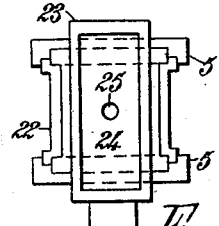
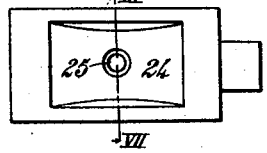 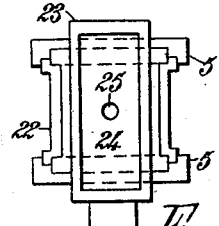
Inventor,
F. T. Ford
By: Glascock Downing & Seebold
Attys.

Patented Sept. 19, 1939

2,173,199

UNITED STATES PATENT OFFICE 2,173,199

BEARING LINING JIG

Francis Thomas Ford, Cardiff, Wales, assignor of one-half to The Ford Welding and Engineering Company Limited, Cardiff, Wales Application August 17, 1938, Serial No. 225,424
In Great Britain August 21, 1937

3 Claims. (Cl. 22—123)

This invention relates to casting and particularly to the lining or re-lining of bearings with white metal and the like and, for instance, the bearings of internal combustion engines.

The invention consists in a jig adapted for use in the casting of bodies of metal of tubular or channel form and particularly in lining and re-lining bearings, comprising a bed or support, a pair of cheek plates between which a mould element for the metal is adapted to be positioned, means for engaging one cheek plate in a fixed position rigidly secured to the bed or support, means adapted to engage the other cheek plate including a carrier slidably associated with guides, a spring or like resilient means adapted to urge the carrier towards the appropriate position with respect to the means adapted to engage the first-mentioned cheek plate in a fixed position, a stop adapted to maintain it in the position for effecting the casting operation, and means for retracting it from the said position to permit the mould element and the body of cast metal to be removed.

Normally, in accordance with the invention, the means adapted to function as a stop is capable of adjustment to permit the jig to be employed, for instance, in re-lining bearings or shells of varying length, and the means of adjustment so provided is preferably of a character adapted to give a coarse and fine adjustment.

Further, in accordance with the invention, means may be provided for adjusting the position of an abutment for the spring or equivalent resilient device in order to ensure that it will operate to retain the displaceable cheek plate in the appropriate position with respect to the cheek plate which is engaged in a fixed position during the casting operation notwithstanding variations in the length of the shells or other channel members forming part of the mould in which metal is to be cast and of the character, design, or finish of the end portions of the bearing or casting.

The coarse and fine adjustment provided may be secured by the provision of means adapted to be located at one or other of a plurality of fixed positions and a screw-threaded device adapted to provide a degree of adjustment within the limits of such fixed positions.

The invention will be described in further detail and by way of example with reference to the accompanying drawing, in which—

Figure 1 is a view in elevation partly in section of a jig in accordance with the invention, Figure 2 is a plan view thereof with a core member and the big end of a piston rod to be re-lined in position, Figure 3 an end elevation, Figure 4 a section on the line IV—IV of Figure 2, Figure 5 is a view in elevation, Figure 6 is a view in plan, Figure 7 a view in section on the line VII—VII of Figure 6, Figures 8, 9 and 10 are views in plan illustrating the application of the invention to the formation of liners of varying character, while, Figures 11 and 12 illustrate other forms of bearing shells and their liners.

In the construction illustrated the jig comprises essentially two end members 1 connected together by cylindrical guide bars 2, a yoke-piece 3 furnished with sleeves 4 engaging the guide bars and slidable thereon, one of the sleeves being longer than the other sleeve, so that the guiding will be mainly effected by the co-operation of the longer sleeve with one of the guide bars.

The fixed end members are arranged to engage a cheek plate 5 of the form and the dimensions appropriate for forming a support for the end of the cast body of metal and, as shown, the big end 7 of a piston rod, to be lined or re-lined, while the slidably mounted yoke-piece is similarly arranged to engage a cheek plate forming the support for the opposite end, both these cheek plates being secured in position by clips 8.

To the slidably mounted yoke-piece is secured a bar 9 slidably arranged in a guide 10 in the end member remote from that in which a cheek plate is adapted to be engaged and this bar is provided with a plurality of holes 11 suitably spaced apart in its length.

On the bar is arranged a sleeve 12 comprising members in screw-threaded engagement one with the other and forming an abutment for a spring 13 located between one end of the sleeve and the adjacent surface of the end member in which the bar is slidably engaged.

One portion of the sleeve is castellated by the provision therein of a plurality of slots 14 of differing depth, so that by the passage of a pin 15 through a pair of such slots and one or other of the holes in the bar the approximate position of the sleeve on the bar may be secured to ensure that the spring is suitably compressed, the final or fine adjustment of the degree of compression of the spring being secured by the relative rotation of the two members forming the sleeve.

On the bar and on the outer side of the end member in which it is slidably engaged there is located a sleeve or collar 16 formed of two parts in screw-threaded engagement one with the other for the purpose of securing a fine adjustment, and with this sleeve or collar 16 co-operates a fork 17 secured on a spindle 18 furnished with a handle 19 whereby it may be rotated to move the bar in opposition to the spring in releasing the completed bearing or casting, and on this handle is provided a hook member (not shown) adapted to be connected with a pedal whereby the like result may be secured.

The collar in question is arranged to be engaged in one or other of a plurality of positions in the length of the bar by passing a pin 20 through slots 21 provided in the collar, which slots may be of different depths to ensure the approximate position of the collar on the bar, so that it may function as a stop cooperating with the adjacent end member in limiting the extent to which the movable yoke-piece is moved under the action of the spring towards the fixed end member in which a cheek plate may be engaged, the fine adjustment being provided by the screw-threaded connection of the two elements forming the collar, the face of the collar directed towards the end plate in which the bar is slidably arranged bearing against the face of the end plate when under the action of the spring the yoke-piece has been moved into the position for effecting the casting operation, the provision of such a stop being more particularly necessary in lining bearings of the type in which the white metal extends beyond the end limits of the shell to form thrust faces as in the case of the piston rod shown in Figure 2.

At this point it may be mentioned that the design of the shells and the big ends of connecting rods varies considerably, certain of such variations being illustrated in Figures 8 to 12. In Figures 8, 10 and 11, 22 is a bearing shell and in Figures 9 and 11, as in Figure 2, 7 indicates the big end of a piston rod. In Figures 8 to 10, as in Figures 1 and 2, the cheek plates are indicated by the reference 5 and in these figures, as also in Figures 2, 4, 5, 6 and 7, 23 indicates the body of the core member or mandrel which is provided with a recess 24 the dimensions of which may be varied within wide limits adapted to constitute a reservoir for a body of the metal to be cast. This recess is provided at its base with an aperture through which the molten metal will pass to the space between the core member and the bearing shell or the like.

The core member, as shown in Figure 4, is of greater depth than the depth of the shell so that it will operate to produce an excess of metal extending above the upper limits of the shell.

I claim:

1. A jig adapted for use in the casting of bodies of metal of tubular or channel form and particularly in lining and relining bearings comprising a pair of supports, a pair of cheek plates between which a mould element for the metal is adapted to be positioned, means rigidly engaging one cheek plate in a fixed position with one of the supports, guides extending between the supports, a carrier engaging the other cheek plate and slidably associated with the guides, a bar rigidly secured to the carrier and slidably extending through one of the supports, an abutment arranged on the bar and adjustable lengthwise thereof, a spring engaged between the support through which the bar slidably extends and the adjustable abutment for urging the carrier and hence the cheek plate engaged therewith towards the fixed cheek plate and for ensuring in accordance with the length of the casting to be formed the appropriate positioning of the movable cheek plate with respect to the fixed cheek plate, a stop member adjustably connected with the bar and adapted to engage against the outer face of the support through which the bar extends, holes through the free end of the bar, recesses in a part of the stop member adapted to be brought into register with one of the holes through the bar for the purpose of effecting a coarse adjustment of the stop member relative to the bar, a pin adapted to engage the hole in the bar with which the recesses in the stop member are brought into register and also the said recesses so as to fix the stop member in engagement with the bar, a collar forming a part of the said stop member, a screw-threaded connection between the said collar and the said recessed part of the stop member, the said screw-threaded connection constituting a fine adjustment for the stop member relative to the bar, and means for retracting the said stop member for the purpose of withdrawing the carrier and facilitating removal of the mould element and the body of cast metal.

2. A jig adapted for use in the casting of bodies of metal of tubular or channel form and particularly in lining and relining bearings comprising a pair of supports, a pair of cheek plates between which a mould element for the metal is adapted to be positioned, means rigidly engaging one cheek plate in a fixed position with one of the supports, guides extending between the supports, a carrier engaging the other cheek plate and slidably associated with the guides, a bar rigidly secured to the carrier and slidably extending through one of the supports, an abutment arranged on the bar and adjustable lengthwise thereof, means for effecting a coarse and fine adjustment of the position of the abutment with respect to the bar, a spring engaged between the support with which the bar is slidably engaged and the adjustable abutment for urging the carrier and hence the cheek plate engaged therewith towards the fixed cheek plate and for ensuring in accordance with the length of the casting to be formed the appropriate positioning of the movable cheek plate with respect to the fixed cheek plate, a stop member adjustably connected with the bar and adapted to engage against the outer face of the support through which the bar extends, holes through the free end of the bar, recesses in a part of the stop member adapted to be brought into register with one of the holes through the bar for the purpose of effecting a coarse adjustment of the stop member relative to the bar, a pin adapted to engage the hole in the bar with which the recesses in the stop member are brought into register and also the said recesses so as to fix the stop member in engagement with the bar, a collar forming a part of the said stop member, a screw-threaded connection between the said collar and the said recessed part of the stop member, the said screw-threaded connection constituting a fine adjustment for the stop member relative to the bar, and means for retracting the said stop member for the purpose of withdrawing the carrier and facilitating removal of the mould element and the body of cast metal.

3. A jig adapted for use in the casting of bodies of metal of tubular or channel form and particularly in lining and relining bearings comprising a pair of supports, a pair of cheek plates between which a mould element for the metal is adapted to be positioned, means rigidly engaging one cheek plate in a fixed position with one of the supports, guides extending between the supports, a carrier engaging the other cheek plate and slidably associated with the guides, a bar rigidly secured to the carrier and slidably extending through one of the supports, an abutment arranged on the bar and adjustable lengthwise thereof, means for effecting a coarse and fine adjustment of the position of the abutment relative to the bar, a spring engaged between the support with which the bar is slidably engaged and the adjustable element for urging the carrier and hence the cheek plate engaged therewith towards the fixed cheek plate and for ensuring in accordance with the length of the casting to be formed the appropriate positioning of the movable cheek plate with respect to the fixed cheek plate, a stop member adjustably connected with the bar so as to be displaceable axially with respect thereto and adapted to engage against the outer face of the support through which the bar extends so as to limit the extent to which the second mentioned cheek plate may be moved by the action of the spring towards the first mentioned cheek plate, means for effecting a coarse and fine adjustment of the position of the stop member with respect to the bar, and means for retracting the said stop member for the purpose of withdrawing the carrier and facilitating removal of the mould element and the body of cast metal.

FRANCIS THOMAS FORD.